United States Patent
Vosburgh (10) Patent No.: US 7,496,002 B2
(45) Date of Patent: Feb. 24, 2009

(54) WATER SUBMERSIBLE ELECTRONICS ASSEMBLY AND METHODS OF USE

(75) Inventor: Frederick Vosburgh, Durham, NC (US)

(73) Assignee: Nekton Research LLC, Durham, NC (US)

(*) Notice: Subject to any disclaimer, the term of this patent is extended or adjusted under 35 U.S.C. 154(b) by 70 days.

(21) Appl. No.: 11/495,957

(22) Filed: Jul. 28, 2006

(65) Prior Publication Data

US 2008/0225643 A1    Sep. 18, 2008

Related U.S. Application Data

(60) Provisional application No. 60/705,004, filed on Aug. 3, 2005.

(51) Int. Cl.
*H04B 11/00* (2006.01)
*B63G 8/00* (2006.01)

(52) U.S. Cl. .................... 367/188; 114/312

(58) Field of Classification Search ............. 367/188, 367/910; 114/312, 314, 337; 181/401
See application file for complete search history.

(56) References Cited

U.S. PATENT DOCUMENTS

| | | | |
|---|---|---|---|
| 3,215,112 A | 11/1965 | Beck, Jr. | |
| 4,979,322 A | 12/1990 | Sloan | |
| 5,197,822 A | 3/1993 | Parks | |
| 5,295,317 A | 3/1994 | Perrott | |
| 5,979,088 A | 11/1999 | Brouwer et al. | |
| 6,058,847 A | 5/2000 | Adams | |
| 6,089,178 A | 7/2000 | Yamamoto et al. | |
| 6,213,021 B1 | 4/2001 | Pickett | |
| 6,250,585 B1 | 6/2001 | Pell | |
| 6,647,853 B2 | 11/2003 | Hickey | |
| 6,647,854 B1 | 11/2003 | Stottlemyer et al. | |
| 6,802,237 B1 | 10/2004 | Jones et al. | |
| 6,951,138 B1 * | 10/2005 | Jones | 367/159 |
| 6,974,356 B2 | 12/2005 | Hobson et al. | |
| 7,006,407 B2 | 2/2006 | Davies et al. | |
| 7,007,626 B2 | 3/2006 | Hobson et al. | |

* cited by examiner

*Primary Examiner*—Ian J Lobo
(74) *Attorney, Agent, or Firm*—Myers Bigel Sibley & Sajovec, P.A.

(57) ABSTRACT

A submersible electronics device for use in a body of water and a substratum floor below the body of water includes a submersible housing, an operational electronics system, and a mobility system. The operational electronics system is mounted in and/or on the housing. The operational electronics system is adapted to communicate with another device and/or to sense at least one of a physical signal and an environmental parameter. The mobility system is selectively operable to fluidize the substratum, vibrate the housing, and/or adjust a buoyancy of the submersible electronics device to selectively move the housing into the substratum to at least partially bury the housing in the substratum and/or to selectively move the housing out of the substratum to at least partially unbury the housing from the substratum.

20 Claims, 10 Drawing Sheets

WATER SUBMERSIBLE ELECTRONICS ASSEMBLY AND METHODS OF USE

RELATED APPLICATION(S)

This application claims the benefit of and priority from U.S. Provisional Patent Application Ser. No. 60/705,004, filed Aug. 3, 2005, the disclosure of which is incorporated herein by reference in its entirety.

STATEMENT OF GOVERNMENT SUPPORT

This invention was made with support under Small Business Innovation Research (SBIR) Program No. N66604-05-C-0287 awarded by the United States Navy. The Government has certain rights in the invention.

FIELD OF THE INVENTION

The present invention relates to water submersible electronics devices and methods for using the same.

BACKGROUND OF THE INVENTION

Persistent underwater monitoring or surveillance, such as in antisubmarine warfare (ASW) or antiterrorism monitoring, typically relies on sonar sensors deployed on the seafloor or towed by surface ships or submarines. Persistent seafloor sensors today may be connected by a cable to a ship or shore station. Access to some regions of littoral seas for such purposes may, however, be denied and/or the cost of widespread persistent monitoring by submarine may be prohibitive or unsustainable. As a result, the U.S. Navy has been developing detached array monitoring systems with battery caches and tethered radio buoys for connectivity. Seafloor electronics devices are, however, often at risk of disturbance or damage by currents or by equipment (e.g., fishing nets) and other objects moving over the seafloor. Sensors that are easily dislodged or damaged are clearly undesirable for persistent or undetected monitoring.

SUMMARY OF THE INVENTION

According to embodiments of the present invention, a submersible electronics device for use in a body of water and a substratum floor below the body of water includes a submersible housing, an operational electronics system, and a mobility system. The operational electronics system is mounted in and/or on the housing. The operational electronics system is adapted to communicate with another device and/or to sense at least one of a physical signal and an environmental parameter. The mobility system is selectively operable to fluidize the substratum, vibrate the housing, and/or adjust a buoyancy of the submersible electronics device to selectively move the housing into the substratum to at least partially bury the housing in the substratum and/or to selectively move the housing out of the substratum to at least partially unbury the housing from the substratum.

According to some embodiments, the mobility system includes: a migration system that is selectively operable to fluidize the substratum and/or vibrate the housing; and a buoyancy system that is selectively operable to adjust a buoyancy of the submersible electronics device.

According to some embodiments, the mobility system includes a buoyancy system that is selectively operable to adjust a buoyancy of the submersible electronics device by releasing at least one ballast member having either a negative buoyancy or a positive buoyancy.

According to some embodiments, the mobility system includes a buoyancy system that is selectively operable to adjust a buoyancy of the submersible electronics device by expanding a volume of the housing or a volume of a supplemental volume expandable housing.

According to some embodiments, the mobility system includes a migration system that is selectively operable to fluidize the substratum.

According to some embodiments, the mobility system includes a migration system that is selectively operable to vibrate the housing to migrate the submersible electronics device into the substratum.

According to some embodiments, the housing has top and bottom opposed ends and is adapted to preferentially orient the housing toward an upright position, wherein the top end overlies the bottom end, as the housing is migrated into the substratum. The submersible electronics device may have negative buoyancy and a shape that provides inertial migration of the submersible electronics into the substratum in use.

According to some embodiments, the operational electronics system includes a communications system operative to send and/or receive communications signals to/from another device.

According to some embodiments, the operational electronics system includes a sensor system operative to sense a parameter of the environment of the submersible electronics device.

According to embodiments of the present invention, a submersible electronics device for use in a body of water and a substratum floor below the body of water includes a submersible housing, an operational electronics system, and a displacement device. The operational electronics system is mounted in and/or on the housing. The operational electronics system is adapted to communicate with another device and/or to sense at least one of a physical signal and an environmental parameter. The displacement device is selectively operable to displace substratum overlying the housing.

According to some embodiments, the displacement device includes a subhousing. According to some embodiments, the subhousing is at least one of expandable and resealable. The subhousing may be volume expandable and retained on the housing when the volume of the subhousing is expanded. The subhousing may form a part of a secondary submersible electronics device that is releasable from the housing. The secondary submersible electronics device may further include the operational electronics system and/or a secondary operational electronics system. The submersible electronics device may include a plurality of secondary electronics devices, each of which is releasable from the housing.

According to some embodiments, the operational electronics system includes a communications system operative to send and/or receive communications signals to/from another device.

According to some embodiments, the operational electronics system includes a sensor system operative to sense a parameter of the environment of the submersible electronics device.

According to method embodiments of the present invention, a method for using a submersible electronics device in a body of water and a substratum floor below the body of water includes providing a submersible electronics device including: a submersible housing; an operational electronics system mounted in and/or on the housing, wherein the operational electronics system is adapted to communicate with another device and/or to sense at least one of a physical signal and an environmental parameter; and a mobility system. The method further includes selectively operating the mobility system to fluidize the substratum, vibrate the housing, and/or adjust a buoyancy of the submersible electronics device to selectively move the housing into the substratum to at least partially bury the housing in the substratum and/or to selectively move the housing out of the substratum to at least partially unbury the housing from the substratum.

According to some embodiments, the method includes burying the submersible electronics device in the substratum and thereafter clearing a path through the substratum for communicating and/or sensing. Clearing a path may include expanding the volume of a subhousing of the submersible electronics device. The method may include releasing the subhousing into the water. The method may include sensing a signal using the operational electronics system. According to some embodiments, the method may include communicating with another device using the operational electronics system, which in some cases can be conducted with a releasable subhousing.

According to further method embodiments of the present invention, a method for sensing includes: releasing a sensor unit having a prescribed weight and negative buoyancy into a body of water such that the weight and negative buoyancy of the sensor unit cause the sensor unit to penetrate and remain buried in a substratum floor below the body of water; and sensing at least one selected signal or parameter using the buried sensor unit. The method may further include generating communications signals from the sensor unit based on the at least one sensed signal or parameter.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the electronics device in use or operation in addition to the orientation depicted in the figures. For example, if the electronics device in the figures is turned over, elements described as "under" or "beneath" other elements or features would then be oriented "over" the other elements or features. Thus, the exemplary term "under" can encompass both an orientation of over and under. The electronics device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a "signal" can be a signal of any suitable type, such as an acoustic, optical, image, radio, electrical, magnetic, electromagnetic, and/or mechanical signal. In some cases, signals can include additional information such as an identifier, a time/date, a location, a classification, a signature, or a command. In some cases, signals can represent environmental parameters such as conductivity, temperature, depth, water current, turbulence, luminescence, turbidity, presence or concentration of dissolved oxygen, pH, chlorophyll presence or concentration, or acoustic noise.

Devices adapted for both sensing and communicating may be referred to herein as "sencomm" devices.

For purposes of this disclosure, "sediment" refers to any material forming the seafloor or substratum in a body of water that is loose and displaceable by fluid flow or vibration.

Some embodiments of the disclosed invention comprise water submersible electronics devices or units and methods of use for sensing, navigation aiding, and/or communicating. The electronics device may be deployed proximate sediment below a body of water (e.g., ocean floor sediment) and at least partly self-bury into the sediment to avoid damage, disturbance, or detection. In some embodiments, at least part of the electronics device can rise with respect to or at least partly emerge from a seafloor. In particular, the electronics device may emerge from the sediment to provide enhanced sensing or communications of various signal types. In some cases, rising includes floating proximate or above the surface of a body of water. In some embodiments, the electronics device can scuttle by at least one of: disrupting a housing of the electronics device; disabling electronics of the electronics device; and sinking in the water.

According to some embodiments, the water submersible electronics device includes a housing, a power supply, a mobility system, and an operational electronics system, which may be or include a sencomm system. In some embodiments, the operational electronics system includes a signal detector and/or a signal emitter. In some cases, the mobility system comprises a migration system and a buoyancy system. According to some embodiments, one or more of the migration system, the operational electronics system, and the buoyancy system each take the form of a respective module. Embodiments of the invention are described hereinbelow with reference to such modules; however, it will be appreciated that these systems may, in accordance with some embodiments, be otherwise configured in non-modular form.

The mobility system or module may include any suitable mechanism(s) that can move the electronics device through sediment. In some cases, the mobility system can provide at least partial emergence of the electronics device from sediment. According to some embodiments, the mobility system is operable to fluidize the substratum, vibrate a housing of the electronics device and/or adjust a buoyancy of the electronics device to move the electronics device into the substratum (to bury the device) or out of the substratum (to unbury the device). In some embodiments, emergence of the electronics device from the substratum is provided by a separable buoyant portion of the electronics device that can float in water or air. According to some embodiments, the mobility system includes a migration system and/or a buoyancy system. The migration system is operative to bury (and, optionally, unbury) the electronics device in the sediment. The buoyancy system is operative to alter the buoyancy of the electronics device to cause the electronics device to float up or down in the water or air.

In some embodiments, the operational electronics system or module is a sencomm system or module that can detect a first type of signal at a first location and move to a second location to send a second type of signal. For example, according to some method embodiments, the electronics device holds station by partial burying in an aquatic substratum, detects an acoustic signal representative of a passing ship while holding station, and thereafter floats to the water surface to send a radio signal to a remote receiver. In some cases, the electronics device floats to the surface and detects additional signals, such as an image or RF signature, which may be sent to the remote receiver. In some cases, the electronics device floats into the air above the surface of the water to detect and/or send signals (e.g., radio signals).

In some embodiments, the operational electronics system is adapted to sense at least one environmental parameter. In some cases, the operational electronics system determines or computes a classification or profile from the sensed data and communicates the result to a remote receiver. For example, the operational electronics system may be operative to sense conductivity, temperature and depth. From this, in some cases, the operational electronics system can calculate a sound velocity profile and transmit the profile by radio. In some cases, multiple such electronics devices are used at the same time to provide data for a sound propagation model.

In some embodiments, the operational electronics system is operative to provide a detectable navigation signal. For example, the operational electronics system may include a sonar transponder that can emit a signal for use as a navigation beacon by a passing vessel or a swimmer. In some cases, the operational electronics system can detect an interrogation signal, which triggers emission of the navigation signal for a period of time. In some cases, the operational electronics system will cease emitting once the interrogation signal power is less than a threshold value. In some cases, the emitted signal includes other information such as an identifier, a location, or operational data.

In some embodiments, the operational electronics system is operative to provide a neutralizing signal. For example, after a predetermined time is reached or an acoustic command is received, the operational electronics system may send a signal that can damage or detonate an object such as a sea mine. In some cases, the signal is an explosive mechanical signal that can damage the mine. In some cases, the signal mimics an acoustic, magnetic, or electrical signal or field from a ship to trigger detonation of the mine.

Methods of using the electronics device may include detecting and sending signals and, in some cases, processing signals. Some such methods include detecting a first signal at a first location and sending a second signal from a second location. Some of such methods include causing the electronics device to migrate down into sediment to at least partially bury the electronics device, which can provide resistance to damage, disturbance, dislodgement, or detection.

According to some embodiments, the electronics device is used for persistent monitoring, such as for antisubmarine warfare, anti-terrorism, or other types of surveillance. In some cases, such use is persistent and resistant to disturbance or detection.

According to some embodiments, the electronics device is used to communicate. In some cases, a first type of signal is detected and a second type is emitted. For example, according to some embodiments, an acoustic signal is detected and a radio signal is emitted. In some cases, a detected signal is repeated to forward a communication.

Electronics devices according to embodiments of the present invention may be used to gather intelligence. According to some embodiments, the electronics device detects a vessel, floats to the surface, captures a signal (such as an image), communicates the signal, and scuttles to avoid detection.

Some methods according to embodiments of the present invention include causing the electronics device or a portion thereof to at least partially emerge from sediment to provide enhanced signal detecting or sending by the operational electronics system. In some cases, methods of the present invention include expanding an expansion module to displace overlying sediment and provide an enhanced signal propagation path to a wave guide of the electronics device. The wave guide may be selectively extended when the expansion module is expanded and retracted prior to retracting the expansion module. In some cases, the electronics device is emerged from the sediment by inflating the expansion module or a buoyantly separable portion of the electronics device with enough buoyant material (such as gas) that the electronics device or separable portion rises to float proximate the water surface or in the air above.

Figure 1:
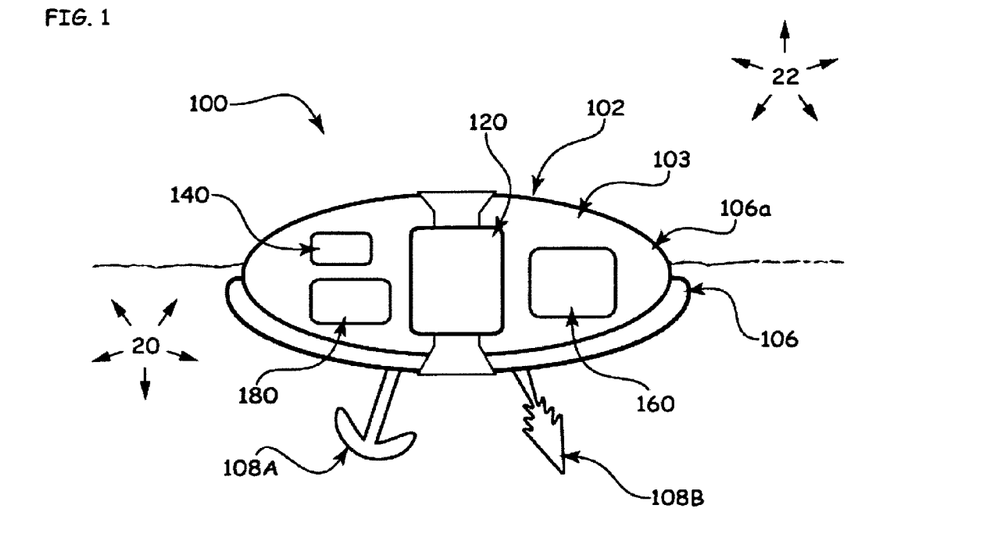
FIG. 1 is a schematic side view of a water submersible electronics device according to embodiments of the present invention.

With reference to FIG. 1, an electronics device or assembly 100 according to embodiments of the present invention is shown therein partially buried in a substratum 20 underlying a body of water 22. The electronics device 10 may be a modular or unitary assembly. The electronics device 100 includes a housing 102. A mobility system 103, an operational electronics system 140, and a power source 180 are disposed in the housing 102. The electronics device 100 can be deployed from any suitable mobile or fixed object such as a vehicle, swimmer, or platform. The electronics device 100 is water submersible and constructed such that the electronic and other water sensitive components thereof are protected from contact with surrounding water.

The housing 102 is water submersible. The housing 102 may be formed of any suitable material such as a polymeric material.

The operational electronics system 140 is adapted or configured to communicate with another device and/or sense at least one of a physical signal and an environmental parameter. According to some embodiments, the operational electronics system 140 is configured as a module. The operational electronics system 140 may include a controller to control operation of the operational electronics system 140 to provide the functionality described herein.

According to some embodiments, the operational electronics system 140 includes a communications system operable and configured to send (emit) and/or receive suitable communications signals to/from another communications device. The communications system may include any suitable configuration and components such as a microprocessor, receiver, emitter, transceiver, antenna, photosensor, transducer, etc. The communications system may be operative to send and/or receive and process any suitable type(s) of communications signals. Suitable types of communications signals may include radiofrequency (RF) signals, acoustic signals, electrical signals, magnetic signals, optical signals, pressure signals, vibratory signals and/or environmental signals. The communications system may be operative to send and/or receive communications signals wirelessly and/or via wireline.

In some embodiments, the operational electronics system 140 includes a sensor system adapted or configured to sense at least one of a physical signal and an environmental parameter. The sensor system includes one or more types of sensor. Suitable sensors may include, for example, sonar, optical, camera, electrical, magnetic, chemical, environmental, and pressure sensors.

In some embodiments, the operational electronics system 140 includes signal circuitry including a detector, a conditioner, a converter, a processor, a timer, a generator, a transducer, and/or a transmitter. The processor can include components for signal conditioning, converting, and processing detected signals and control programs. The timer may include a clock or counter that can be used for preprogrammed activation of the electronics device 100. In some cases, the signal generator is operative to generate an electromagnetic pulse that can disable circuits in the operational electronics system 140 or a secondary object, such as a nearby sea mine. In some cases, the electronics device 100 includes an explosive charge that can scuttle the electronics device 100 by damaging the housing 102 or the operational electronics system 140.

According to some embodiments, the operational electronics system 140 is configured to both communicate with another device and sense at least one of a physical signal and an environmental parameter and may be referred to as a "sencomm system". In this case, the operational electronics system 140 will include both a communications system and a sensor system, which may be suitably integrated. The operational electronics system 140 is illustrated and will be referred to hereinbelow as a sencomm module; however, it will be appreciated that in accordance with other embodiments the operational electronics system 140 may be a non-sencomm system and/or non-modular in construction.

The power source 180 may include any suitable electronics device that can store or generate electrical energy, such as a battery or generator. The power source 180 is operatively connected to each of the mobility system 103 and the operational electronics system 140 to provide power to enable the functionality described herein.

The mobility system 103 includes a migration system or module 120 and a buoyancy system or module 160. The migration module 120 and the buoyancy module 160 can be selectively operated together or separately to selectively move the electronics device 100 down into the sediment or substratum 20, up through the substratum 20, and up and/or down in the water 22, and up and/or down in the air above the surface of the water. Other embodiments may include mobility systems including a migration module without a buoyancy module or a buoyancy module without a migration module. The mobility system 103 may include a controller to control operation of the mobility system 103, the migration system 120 and the buoyancy system 160 to provide the functionality described herein.

The migration module 120 may be of any suitable type or construction. Suitable migration systems may include a fluidizer, a pump, a fan, a scoop, a vibrator, and/or a mechanical oscillator. In some cases, the migration module 120 can be operated to provide reversible actuation to unbury the electronics device 100 so that the electronics device 100 can be at least partly emerged or uncovered from the sediment 20. The migration module 120 may be constructed and operable as described hereinbelow with reference to further embodiments of the invention.

The buoyancy module 160 is operable to selectively provide negative, positive, and/or neutral buoyancy. The buoyancy module 160 may selectively control the buoyancy of the electronics device 100 between positive, neutral and negative buoyancy states. In some embodiments, the buoyancy module 160 includes an elastic or flexible inflatable structure forming a part of or attached to the housing 102. The buoyancy module 160 may be constructed and operable as described hereinbelow with reference to further embodiments of the invention.

According to some embodiments, the buoyancy module 160 is operable to increase the buoyancy of the electronics device 100 sufficiently to cause the electronics device to rise up through the water. According to some embodiments, the buoyancy module 160 is operable to increase the buoyancy of the electronics device 100 sufficiently to cause the electronics device 10 to rise up through the water to the surface of the water such that the electronics device 100 remains on the surface of the water. According to some embodiments, the buoyancy module 160 is operable to increase the buoyancy of the electronics device 100 sufficiently to cause the electronics device 100 to rise up through the water and out of the water so that the electronics device 100 floats in the air above the surface of the water.

According to some embodiments, the buoyancy module 160 is operable to decrease the buoyancy of the electronics device 100 sufficiently to cause the electronics device 100 to descend from the air to float on the surface of the water. According to some embodiments, the buoyancy module 160 is operable to decrease the buoyancy of the electronics device 100 sufficiently to cause the electronics device 100 to descend through the water to or toward the substratum 20.

According to some embodiments, the buoyancy module 160 is operable to control the buoyancy of the electronics device 100 at substantially neutral buoyancy so as to retain the electronics device 100 at a constant depth in the water above the substratum 20.

In some embodiments, the electronics device 100 has a release system including an anchor member or portion 106 and a buoyantly separable member or portion 106a. The buoyantly separable portion 106a may include the housing 102, the senncomm module 140, the buoyancy module 160 and the power source 180. In some embodiments, the housing 102 can selectively function as a buoyancy provider. For example, according to some embodiments, the housing 102 is a volume expandable structure (e.g., balloon-like) that can be inflated by the electronics device 100 and released from the anchor portion 106 to rise from the substratum and float in air to send a signal.

In some embodiments, the electronics device 100 includes an anchor 108a or penetrator 108b that penetrates the substratum and resists dislodging. As shown, the anchor 108a or penetrator 108b may form a part of the anchor portion 106.

Figure 2:
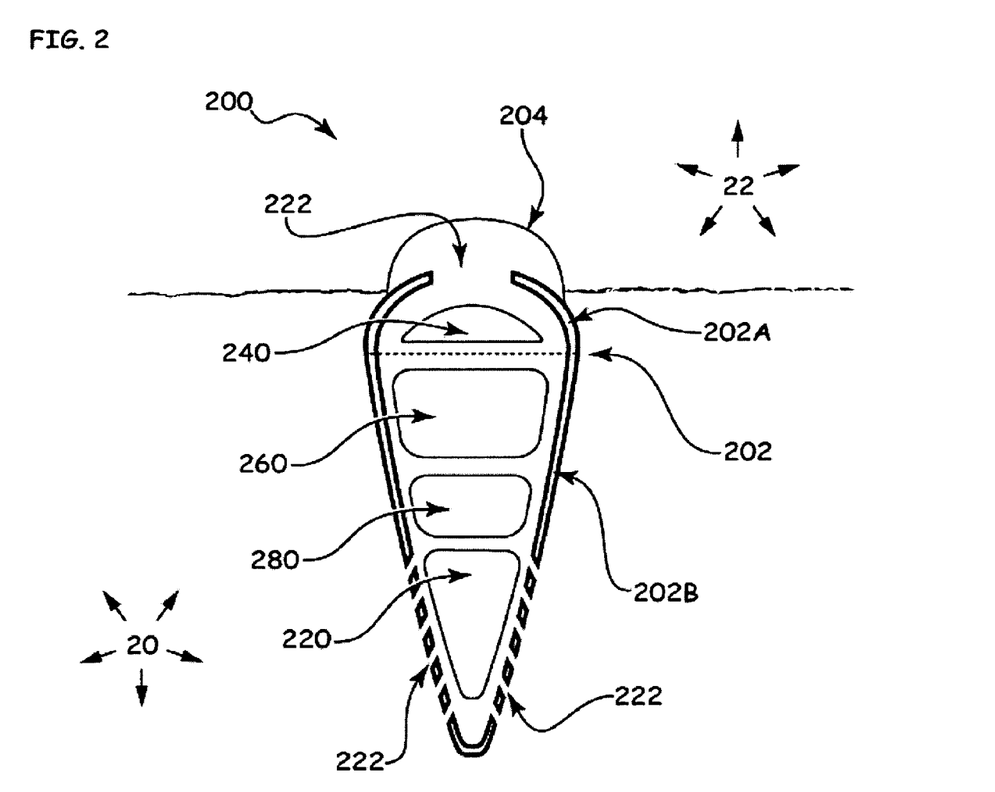
FIG. 2 is a schematic side view of a water submersible electronics device according to further embodiments of the present invention.

With reference to FIG. 2, an electronics device 200 according to further embodiments of the present invention is shown therein. The electronics device 200 may have a migration module 220, a senncomm module 240, a buoyancy module 260 and a power source 280 and correspond to the electronics device 100 of FIG. 1, for example, except as follows. The electronics device 200 includes a housing 202 in place of the housing 102. The housing 202 is asymmetric about a horizontal axis. The housing 202 includes an upper portion 202a, a lower portion 202b, and an extendible portion 204. The upper housing portion 202a has a smooth, relatively low profile. The lower housing portion 202b has a sediment penetrating profile or construction. In some embodiments, at least one of the housing portions 202a, 202b has at least one flow opening 222. The flow openings 222 may serve as passages for a forced flow of water from the migration module 220, which may be a fluidizer. The extendible housing portion 204 can serve as or to provide a signal outlet or wave-guide for signal propagation with reduced or minimized signal attenuation. For example, the extendible housing portion 204 can be a balloon member that can be inflated with water or gas to extend its surface upward with respect to the sediment 20. In some embodiments, a sencomm module 240 is mounted adjacent the extendible housing portion 204.

Figure 3:
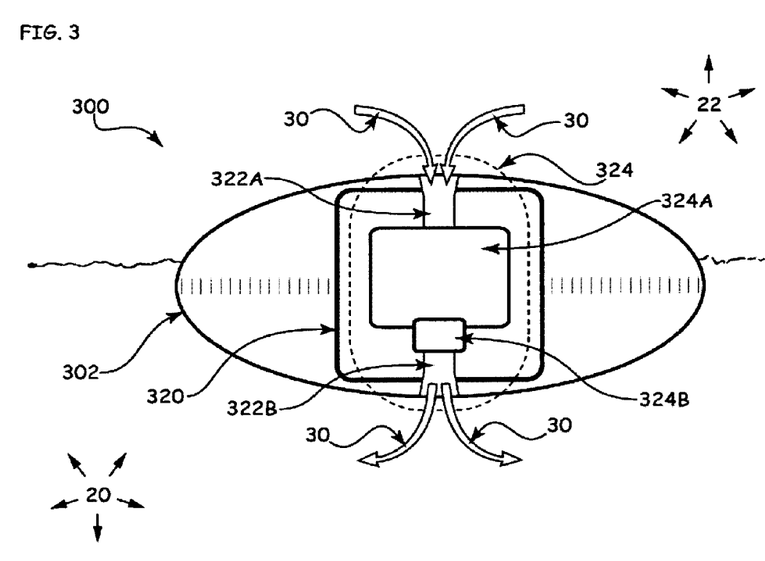
FIG. 3 is a schematic side view of a water submersible electronics device according to further embodiments of the present invention.

With reference to FIG. 3, an electronics device 300 according to further embodiments of the present invention is shown therein. The electronics device 300 includes a migration module 320 that includes a fluidizing system or fluidizer 324, and may otherwise be constructed as described above (e.g., including a sencomm module, a power supply and a buoyancy module). The fluidizer 324 drives a forced flow 30 of the water 22 through the housing 302. The forced flow 30 of water continues into the sediment 20 to fluidize the sediment 20. The fluidized sediment 20 permits the housing 302 to settle down into the sediment 20 to bury the housing 302. The fluidized sediment 20 may assume a quicksand-like consistency or condition. The fluidizer 324 includes a flow generator 324a, one or more inlets 322a and one or more outlets 322b. The outlets 322b can be positioned so that they direct a flow of water 30 towards sediment underlying the electronics device 300. In some embodiments, the outlets 322b include an array of holes. In some embodiments, the fluidizer 324 further includes a valve 324b to control the speed and/or direction of the flow 30. The housing 302 may be shaped so as to induce scouring removal of underlying sediment 20.

Figure 4:
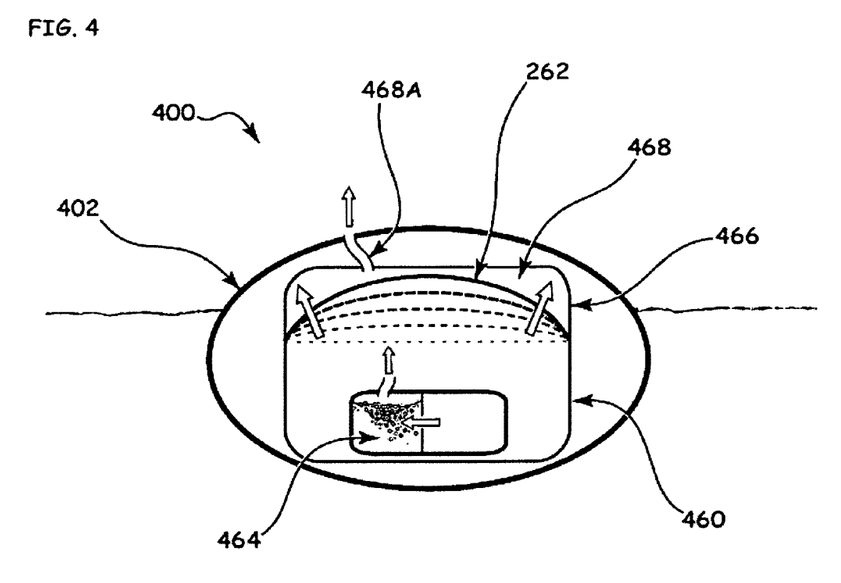
FIG. 4 is a schematic side view of a water submersible electronics device according to further embodiments of the present invention.

With reference to FIG. 4, an electronics device 400 according to further embodiments of the present invention is shown therein. The electronics device 400 includes a housing 402 and may correspond to the electronics device 100 (e.g., including a sencomm module, a power supply and a migration module) except as follows. The electronics device 400 includes a buoyancy module 460 (which may be used as the buoyancy module 160 of FIG. 1). The buoyancy module 460 includes a bladder 462, a buoyant material provider 464, and a subhousing 466. The bladder 462 and the buoyant material provider 464 are disposed in the subhousing 466, which may in turn be disposed in the housing 402. A subchamber 468 is defined between the subhousing 466 and the bladder 462 and communicates with the exterior of the housing 402 via a passage 468a. The buoyant material provider 464 may be any suitable device operable to selectively provide a gas, liquid, or solid type buoyant material having a low density as compared to water into the bladder 462. In use, the buoyant material provider 464 can be actuated to force the buoyant material into the bladder 462 and thereby expand the bladder 462. As the bladder 462 expands, water is displaced from the subchamber 468 through the passage 468a to reduce the mass and density of the electronics device 400 but not substantially alter its volume, thereby decreasing the electronics device's 400 density and increasing its buoyancy. A mechanism may also be provided to release or remove the buoyant material from the bladder 462 to permit the bladder 462 to contract, thereby reducing the buoyancy of the electronics device 400.

Figure 5:
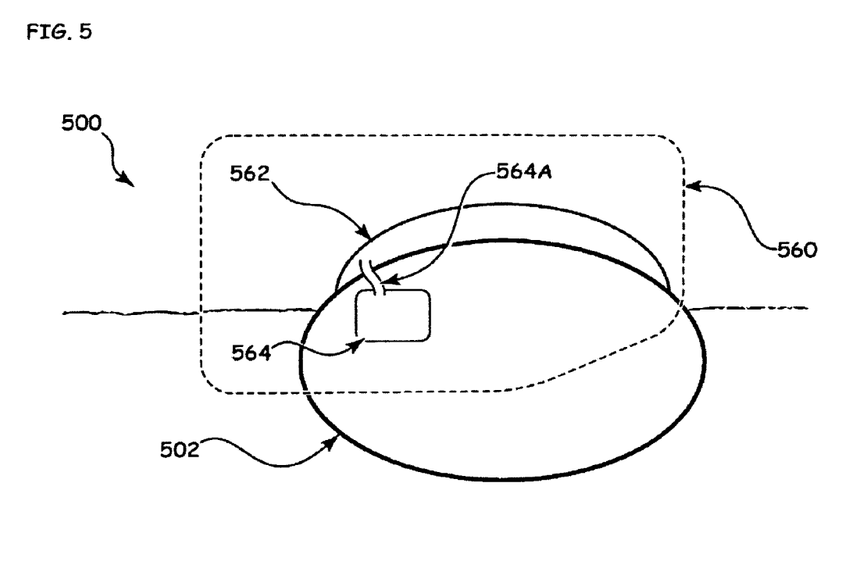
FIG. 5 is a schematic side view of a water submersible electronics device according to further embodiments of the present invention.

With reference to FIG. 5, an electronics device 500 according to further embodiments of the present invention is shown therein. The electronics device 500 includes a housing 502 and may correspond to the electronics device 100 (e.g., including a sencomm module, a power supply and a migration module) except as follows. The electronics device 500 includes a buoyancy system 560 (which may be used as the buoyancy module 160 of FIG. 1). The buoyancy system 560 includes an external bladder 562 and a gas provider 564. The gas provider 564 is selectively operable to generate a pressurized gas to inflate the bladder 562 via a passage 564a. In this manner, the buoyancy system 560 can increase the volume of the electronics device 500 without substantially altering its mass, thereby decreasing the electronics' device's 500 density and increasing its buoyancy. A mechanism may also be provided to release or remove the pressurized gas from the bladder 562 to permit the bladder 562 to contract, thereby reducing the buoyancy of the electronics device 500. The bladder 562 or an additional bladder may also be provided to displace water from the housing 1400 as described above. According to some embodiments, the housing 502 is rigid while the bladder 562 is flexible.

Figure 6:
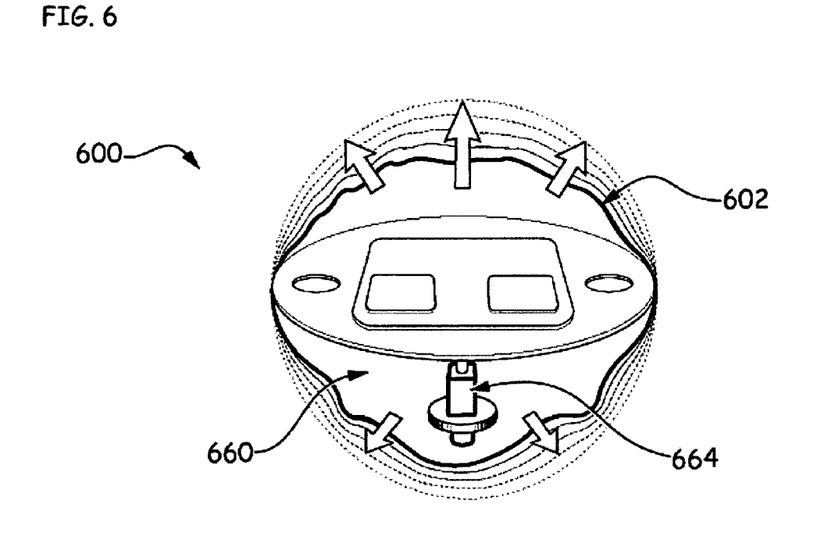
FIG. 6 is a schematic perspective view of a water submersible electronics device according to further embodiments of the present invention.

With reference to FIG. 6, an electronics device 600 according to further embodiments of the present invention is shown therein. The electronics device 600 includes a housing 602 and may correspond to the electronics device 100 (e.g., including a sencomm module, a power supply and a migration module) except as follows. The electronics device 600 includes a buoyancy system 660 (which may be used as the buoyancy module 160 of FIG. 1). The buoyancy system 660 includes the housing 602 and a buoyancy provider 664. The buoyancy provider 664 is selectively operable to force a buoyancy material into the housing 602 to expand the volume of the housing 602. According to some embodiments, the buoyancy provider 664 is a gas provider that is selectively operable to generate a pressurized gas to inflate the housing 602. In this manner, the buoyancy system 660 can increase the volume of the electronics device 600 and decrease the density of the electronics device 600 to increase its buoyancy.

The buoyancy providers as discussed herein (e.g., the buoyancy providers 160, 260, 460, 560, 660) may be of any suitable type and construction. According to some embodiments, the buoyancy providers 160, 260, 460, 560, 660 include a gas generator, a gas releaser, a liquid provider, and/or a solid releaser.

According to some embodiments, the buoyancy provider includes a gas generator that can mix a reactive material with water or other aqueous solution to release a pressurized gas. Suitable reactive materials may include, for example, lithium hydride, sodium, sodium in silicon gel, peroxide, carbonate, and/or carbide. In some cases, the aqueous solution can have a reaction fostering property, such as acidity. In some cases, two reactive materials can be mixed in the absence of water. In some cases, gas generation can be caused by other means, e.g., heating, compressing, or electrifying.

According to some embodiments, the buoyancy provider includes a gas or solid releaser. According to some embodiments, the buoyancy provider includes a container of pressurized carbon dioxide or other gas that is released to expand a bladder or displace water from a housing.

According to some embodiments, the buoyancy provider includes a liquid provider. According to some embodiments, the liquid provider includes a pump selectively operable to convey a low density (i.e., lower in density than the water surrounding the electronics device) liquid from a reservoir, which can be external to the housing or electronics device.

In some embodiments, the electronics device has a separable portion that can float in the water or the air above. In some cases, the separable portion includes a gas holding component. In some cases, the gas holding component includes a volume of gas providing positive buoyancy in water or in air. In some cases, the separable portion includes a sensing component, a communication component, a navigating component, and/or a scuttling component. In some embodiments, the separable portion is connected to the main portion of electronics device (e.g., by a tether). In some cases, the tether or other connecting member conducts power or signals between the main portion of electronics device and the separable portion.

Figure 7:
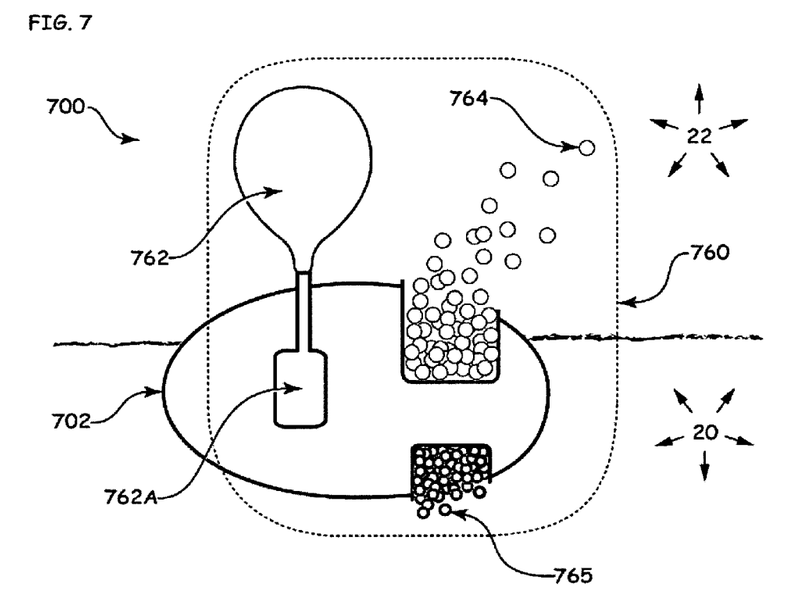
FIG. 7 is a schematic side view of a water submersible electronics device according to further embodiments of the present invention.

With reference to FIG. 7, an electronics device 700 according to further embodiments of the present invention is shown therein. The electronics device 700 includes a housing 702 and may correspond to the electronics device 100 (e.g., including a sencomm module, a power supply and a migration module) except as follows. The electronics device 700 includes a buoyancy system 760 (which may be used as the buoyancy module 160 of FIG. 1).

The buoyancy system 760 includes releasable ballast 764 and releasable ballast 765 contained in respective compartments 764*a* and 765*a* in the housing 702. The electronics device 700 may include retractable doors or other suitable mechanisms to selectively release the ballasts 764, 765 from their compartments 764*a*, 765*a*. According to some embodiments, the ballasts 764 are "low density" ballasts and the ballasts 765 are "high density" ballasts. The ballasts 764 can be selectively released by the electronics device 700 to lower the overall density of the electronics device 700, thereby causing the electronics device 700 to become more positively buoyant in the water 22. The ballasts 765 can be selectively released by the electronics device 700 to lower the overall density of the electronics device 700, thereby causing the electronics device 700 to become more negatively buoyant in the water 22. In this way, the buoyancy of the electronics device 700 can be adjusted to raise or lower the electronics device 700 in the water 22. According to other embodiments, only one of the two types of ballast is provided.

The ballasts 764, 765 may be formed of any suitable material and configuration. Suitable materials for the high density ballasts 765 may include lead, steel, iron, stone, glass, or other material less dense than water. Suitable materials for the low density ballasts 764 may include gas, wood, plastic, petroleum, or other materials less dense than water.

The buoyancy system 760 may additionally or alternatively include an external balloon-type bladder 762 and a gas provider 762*a*. The gas provider 762*a* can be a mixer type that can mix a liquid and material to produce a gas such as hydrogen, oxygen, acetylene, or carbon dioxide, for example. The gas provider 762*a* can be selectively operated to generate a pressurized gas to inflate the bladder 762. In this manner the buoyancy system 760 can increase the volume of the electronics device 700 without substantially altering its mass, thereby decreasing the electronics' device's 700 density and increasing its buoyancy.

Figure 8:
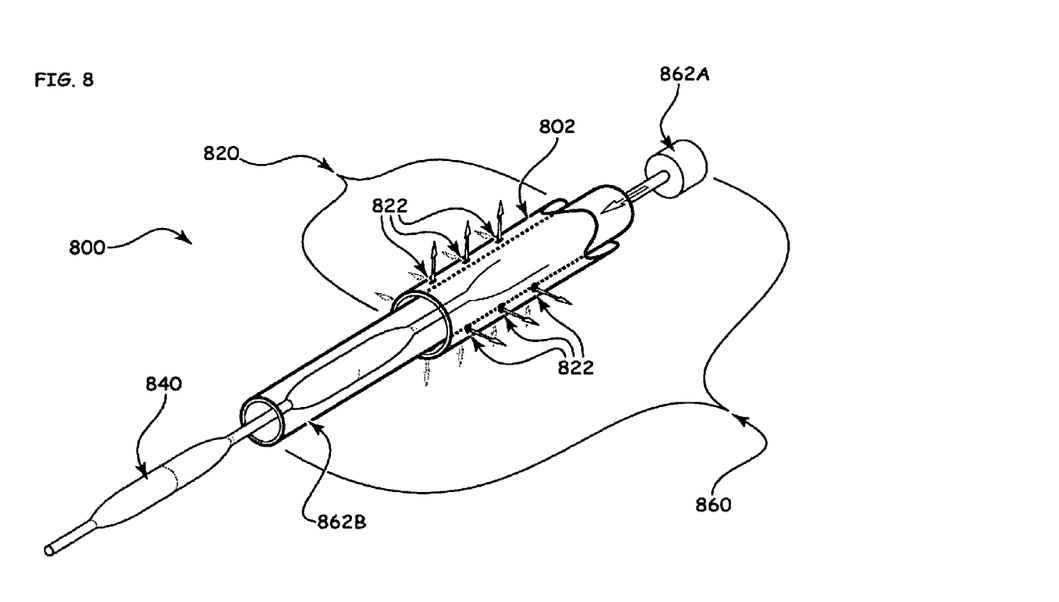
FIG. 8 is a schematic perspective view of a water submersible electronics device according to further embodiments of the present invention.

With reference to FIG. 8, an electronics device 800 according to further embodiments of the present invention is shown therein. The electronics device 800 includes a housing 802, a buoyancy module 860, a migration module 820, and a plurality of sencomm units 840 contained in the buoyancy module 860. The sencomm modules 840 may be arranged as a linear array. Each sencomm module 840 may include an operational electronics system therein that is capable of sensing and communicating externally of the electronics device 800. The housing 802 may be elongated and tubular (e.g., a cylindrical tube) as shown.

The buoyancy module 860 includes a fluid receiving internal component 862*b*. The internal component 862*b* contains a low density liquid (i.e., a liquid having a density less than that of the surrounding water). The low density liquid can be selectively pumped into or out of the internal component 862*b* to adjust the buoyancy of the electronics device 800. The low density liquid may be supplied from a reservoir 862*a* external to the electronics device 800 to a desirably buoyancy altered portion thereof. The internal component 862*b* can substantially surround one or more sencomm modules 840.

The migration module 820 may be of any suitable configuration to enable the electronics device 800 to self-bury. For example, the migration module 820 may include a fluidizer (e.g., as described above) having fluid outlets 822 to fluidize underlying sediment to cause the electronics device 800 to sink or settle into the fluidized sediment.

Figure 9:
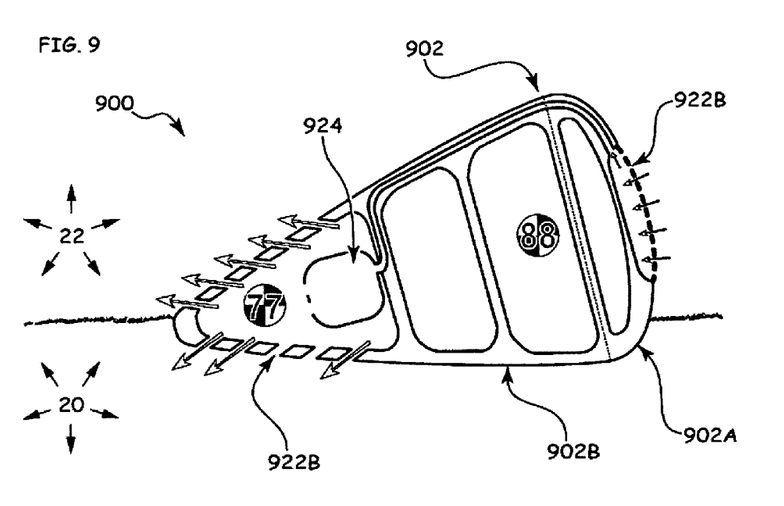
FIG. 9 is a schematic side view of a water submersible electronics device according to further embodiments of the present invention.

With reference to FIG. 9, an electronics device 900 according to further embodiments of the present invention is shown therein. The electronics device 900 includes a housing 902 and may correspond to the electronics device 100 (e.g., including a sencomm module, a power supply and a buoyancy module) except as follows. The electronics device 900 has a center of mass 77 and center of buoyancy 88 that are spatially located relative to one another to provide a righting moment to desirably control migration into sediment. According to some embodiments and as shown in FIG. 9, the center of mass 77 is located proximate a lower surface 902a with the center of buoyancy 88 being located proximate an upper surface 902b to orient the electronics device 900 during penetration into the underlying sediment 20.

In some embodiments, the electronics device 900 has fluid outlets 922b located near the center of mass 77. A fluidizer 924 draws water through fluid inlets 922b (which may be located proximate the center of buoyancy 88) and forces the drawn water out through the outlets 922b to fluidize the adjacent sediment 20 to aid penetration.

According to some embodiments, the electronics device 900 is negatively buoyant. According to some methods of the present invention, the electronics device 900 is dropped from above the sediment 20 so that the electronics device 900 penetrates the sediment 20 by force of gravity. The shape and center of gravity placement of the device 900 passively orient the electronics device 900 as it passively penetrates the sediment 20. In some embodiments, the electronics device 900 can self-bury itself into the sediment 20 following the initial gravity driven penetration. According to some embodiments, the self-burying apparatus (e.g., the fluidizer 924) can be omitted or remain unused so that the electronics device is buried by force of gravity and environmental action (e.g., build up of sediment over the electronics device 900 by wave action) alone.

According to some embodiments, the electronics device 900 is a sensor unit that includes a sensing system that senses at least one selected signal or parameter while remaining buried in the substratum. According to some embodiments, the electronics device 900 also generates or sends communications signals based on the at least one sensed signal or parameter.

Figure 10:
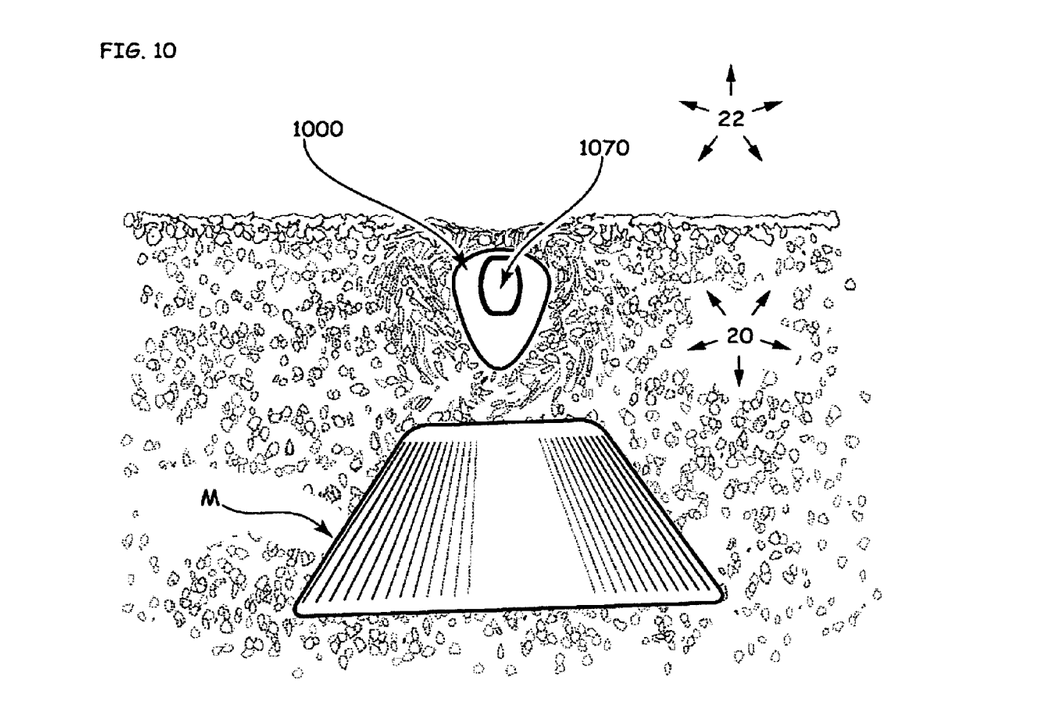
FIG. 10 is a schematic side view of a water submersible electronics device according to further embodiments of the present invention and a buried object.

With reference to FIG. 10, an electronics device 1000 according to further embodiments of the present invention is shown therein along with a buried object M. According to some embodiments, the buried object M is a mine that is at least partly buried in sediment 20. The electronics device 1000 is adapted to migrate through the sediment 20 to a position proximate the buried object M. The electronics device 1000 includes a neutralizing system 1070. The neutralizing system 1070 is adapted to neutralize the buried object M. The neutralizing system 1070 may include a command receiver or clock to activate a neutralizing function of the neutralizing system 1070. The neutralizing system 1070 may include an acoustic, magnetic, or electric field emitter that can trigger detonation of the buried object M. The neutralizing system 1070 may include an explosive charge that can detonate, damage, or destroy the object M. In accordance with method embodiments of the invention, the electronics device 1000 is self-migrated through the sediment 20 to a location nearer the object M, and the neutralizing system 1070 activates to detonate or disable the object M. According to some embodiments, the object M is a mine and the neutralizing system 1070 activates to detonate the mine M.

Uses of the electronics device as described herein in accordance with the present invention can include any of the following: monitoring, detecting, imaging, classifying, identifying, locating, tracking, environment characterizing, oceanographic profiling, intelligence gathering, surveilling, reconnoitering, communicating, neutralizing, and navigation aiding. The method of use can comprise reducing probability of damage, disturbance or detection of the electronics device, such as by migrating into sediment, or self-burying.

According to some embodiments, the electronics device is used for persistent monitoring to detect a vehicle of interest. An example method includes deploying the electronics device, whereupon the electronics device at least partly buries itself in sediment proximate where a vessel is expected to pass, detects a signal (e.g., a radio signal), classifies the signal, and acts responsively. In some cases, the electronics device acts responsively by rising to the surface or buoyantly separating a portion of the electronics device to rise to the water surface. In some cases, the electronics device records at least one image or signal while on or above the water, and communicates that data via a remote receiver.

According to some embodiments, the electronics device is used for environment characterizing for regulatory or oceanographic applications. In some cases, characterizing can be conducted proximate the substratum, in the water column, or at or above the surface of the water. In some embodiments, the electronics device rises buoyantly to the water surface while sampling conductivity, temperature and depth of the water a plurality of times. In some cases, the electronics device computes a sound velocity profile from the sampled data. The sampled data or sound velocity profile may then be transmitted to a remote receiver after the electronics device reaches the surface. Another illustrative application is detecting tsunami or storm waves using the electronics device.

According to some embodiments, the electronics device is used to aid navigation by emitting a beacon signal detectable by a vessel or swimmer. In some such embodiments, the electronics device is deployed on the seafloor where it buries itself at least in part to reduce the probability of disturbance, damage or detection, and enters a power conserving sleep mode. In some cases, the electronics device partly emerges from the sediment for more effective signal detection or communicating. In some cases, the electronics device remains in sleep mode until a preprogrammed time is reached or an interrogation signal from a user or passing vessel is detected. The electronics device then emits a beacon signal. In some cases, the electronics device ceases emitting the beacon signal after a preset time or when the interrogation signal falls below a threshold. In some cases, the signal can be modified to communicate information such as identification, location, and operational update.

According to some embodiments, the electronics device is used to neutralize an object, such as a sea mine. In some cases, the electronics device is deployed on the sediment overlying the mine so it can migrate at least partly into the sediment to a position proximate the mine. In some cases, the electronics device then enters sleep mode until a preprogrammed time is reached or a command is detected. The electronics device then operates, in some cases by detonating to damage or trigger detonation of the buried object. In some cases, the electronics device generates a signal that can trigger mine detonation such as by mimicking the acoustic, magnetic, or electrical signal of a ship.

According to some embodiments, the electronics device is used to aid communication. In an illustrative example, a buried electronics device detects an acoustic signal, such as one propagating from an undersea acoustic communication system such as SeaWeb developed by SPAWAR command of the US Navy or a vehicle using the micro-modem for sonar communications available from the Woods Hole Oceanographic Institute, Woods Hole, Mass. In some embodiments, upon detecting the acoustic signal, the electronics device or a releasable portion thereof floats to the water surface and sends a radio signal to a remote receiver. In some embodiments, the electronics device acts as a repeater and emits a copy of the detected message.

According to some embodiments, the electronics device is used to carry a payload.

The various features and methods described herein may be suitably combined and modified in accordance with further embodiments of the present invention.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A submersible electronics device for use in a body of water and a substratum floor below the body of water, the submersible electronics device comprising:
    a submersible housing;
    an operational electronics system mounted in and/or on the housing, wherein the operational electronics system is adapted to communicate with another device and/or to sense at least one of a physical signal and an environmental parameter; and
    a mobility system selectively operable to fluidize the substratum, vibrate the housing, and/or adjust a buoyancy of the submersible electronics device to selectively move the housing into the substratum to at least partially bury the housing in the substratum and/or to selectively move the housing out of the substratum to at least partially unbury the housing from the substratum;
    wherein the mobility system includes:
        a migration system that is selectively operable to fluidize the substratum and/or vibrate the housing; and
        a buoyancy system that is selectively operable to adjust a buoyancy of the submersible electronics device.

2. The submersible electronics device of claim 1 wherein the buoyancy system is selectively operable to adjust a buoyancy of the submersible electronics device by releasing at least one ballast member having either a negative buoyancy or a positive buoyancy.

3. The submersible electronics device of claim 1 wherein the buoyancy system is selectively operable to adjust a buoyancy of the submersible electronics device by expanding a volume of the housing or a volume of a supplemental volume expandable housing.

4. The submersible electronics device of claim 1 wherein the migration system is selectively operable to fluidize the substratum.

5. The submersible electronics device of claim 1 wherein the migration system is selectively operable to vibrate the housing to migrate the submersible electronics device into the substratum.

6. The submersible electronics device of claim 1 wherein the housing has top and bottom opposed ends and is adapted to preferentially orient the housing toward an upright position, wherein the top end overlies the bottom end, as the housing is migrated into the substratum.

7. The submersible electronics device of claim 6 wherein the submersible electronics device has negative buoyancy and a shape that provides inertial migration of the submersible electronics into the substratum in use.

8. The submersible electronics device of claim 1 wherein the operational electronics system includes a communications system operative to send and/or receive communications signals to/from another device.

9. The submersible electronics device of claim 1 wherein the operational electronics system includes a sensor system operative to sense a parameter of the environment of the submersible electronics device.

10. A submersible electronics device for use in a body of water and a substratum floor below the body of water, the submersible electronics device comprising:
    a submersible housing;
    an operational electronics system mounted in and/or on the housing, wherein the operational electronics system is adapted to communicate with another device and/or to sense at least one of a physical signal and an environmental parameter; and
    a displacement device selectively operable to displace substratum overlying the housing;
    wherein the displacement device includes a subhousing; and
    wherein the subhousing is volume expandable and is retained on the housing when the volume of the subhousing is expanded.

11. The submersible electronics device of claim 10 wherein the subhousing is releasable.

12. The submersible electronics device of claim 10 wherein the subhousing forms a part of a secondary submersible electronics device that is releasable from the housing.

13. The submersible electronics device of claim 12 wherein the secondary submersible electronics device further includes the operational electronics system and/or a secondary operational electronics system.

14. The submersible electronics device of claim 13 including a plurality of secondary electronics devices, each of which is releasable from the housing.

15. The submersible electronics device of claim 10 wherein the operational electronics system includes a communications system operative to send and/or receive communications signals to/from another device.

16. The submersible electronics device of claim 10 wherein the operational electronics system includes a sensor system operative to sense a parameter of the environment of the submersible electronics device.

17. A submersible electronics device for use in a body of water and a substratum floor below the body of water, the submersible electronics device comprising:
    a submersible housing;
    an operational electronics system mounted in and/or on the housing, wherein the operational electronics system is adapted to communicate with another device and/or to sense at least one of a physical signal and an environmental parameter; and
    a mobility system selectively operable to fluidize the substratum, vibrate the housing, and/or adjust a buoyancy of the submersible electronics device to selectively move the housing into the substratum to at least partially bury the housing in the substratum and/or to selectively move the housing out of the substratum to at least partially unbury the housing from the substratum;
    wherein the mobility system includes a migration system that is selectively operable to fluidize the substratum.

18. A submersible electronics device for use in a body of water and a substratum floor below the body of water, the submersible electronics device comprising:
- a submersible housing;
- an operational electronics system mounted in and/or on the housing, wherein the operational electronics system is adapted to communicate with another device and/or to sense at least one of a physical signal and an environmental parameter; and
- a displacement device selectively operable to displace substratum overlying the housing;
- wherein the displacement device includes a subhousing; and
- wherein the subhousing forms a part of a secondary submersible electronics device that is releasable from the housing.

19. The submersible electronics device of claim 18 wherein the secondary submersible electronics device further includes the operational electronics system and/or a secondary operational electronics system.

20. The submersible electronics device of claim 19 including a plurality of secondary electronics devices, each of which is releasable from the housing.

* * * * *